No. 623,351. Patented Apr. 18, 1899.
A. A. BOUTON & S. H. VARNUM.
SEWING MACHINE.
(Application filed Mar. 12, 1898.)
(No Model.) 6 Sheets—Sheet 1.
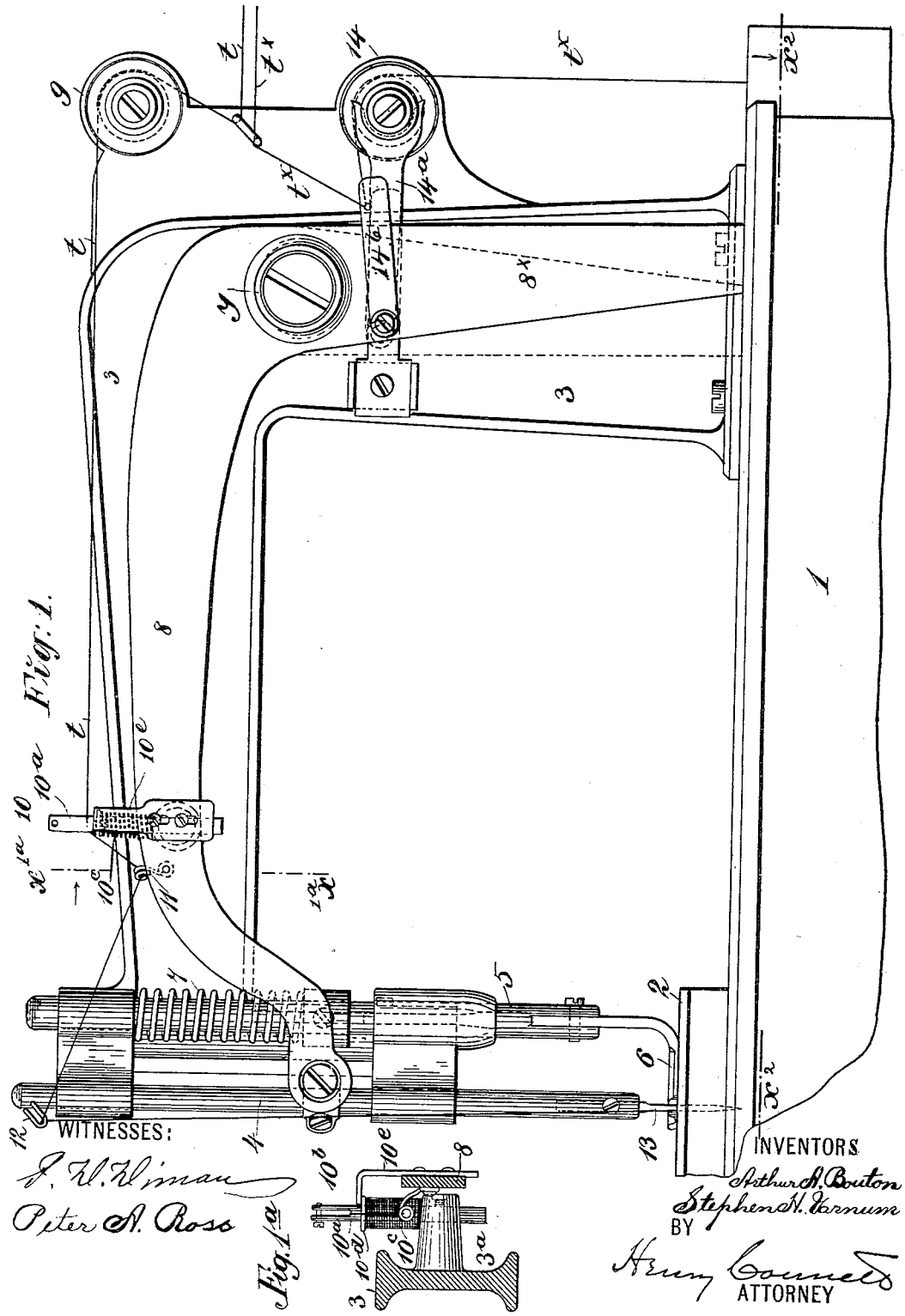

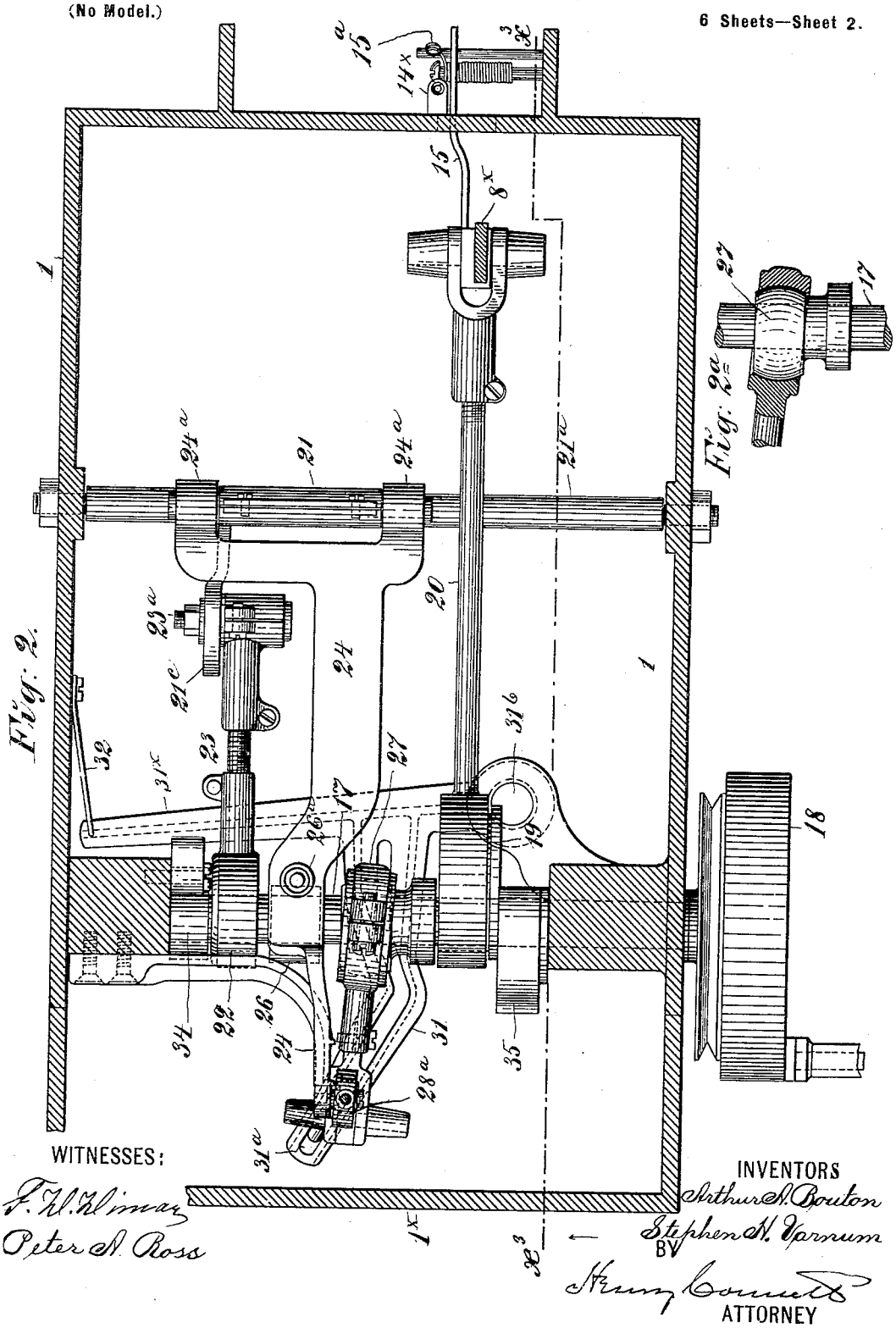

No. 623,351. Patented Apr. 18, 1899.
A. A. BOUTON & S. H. VARNUM.
SEWING MACHINE.
(Application filed Mar. 12, 1898.)
(No Model.) 6 Sheets—Sheet 3.
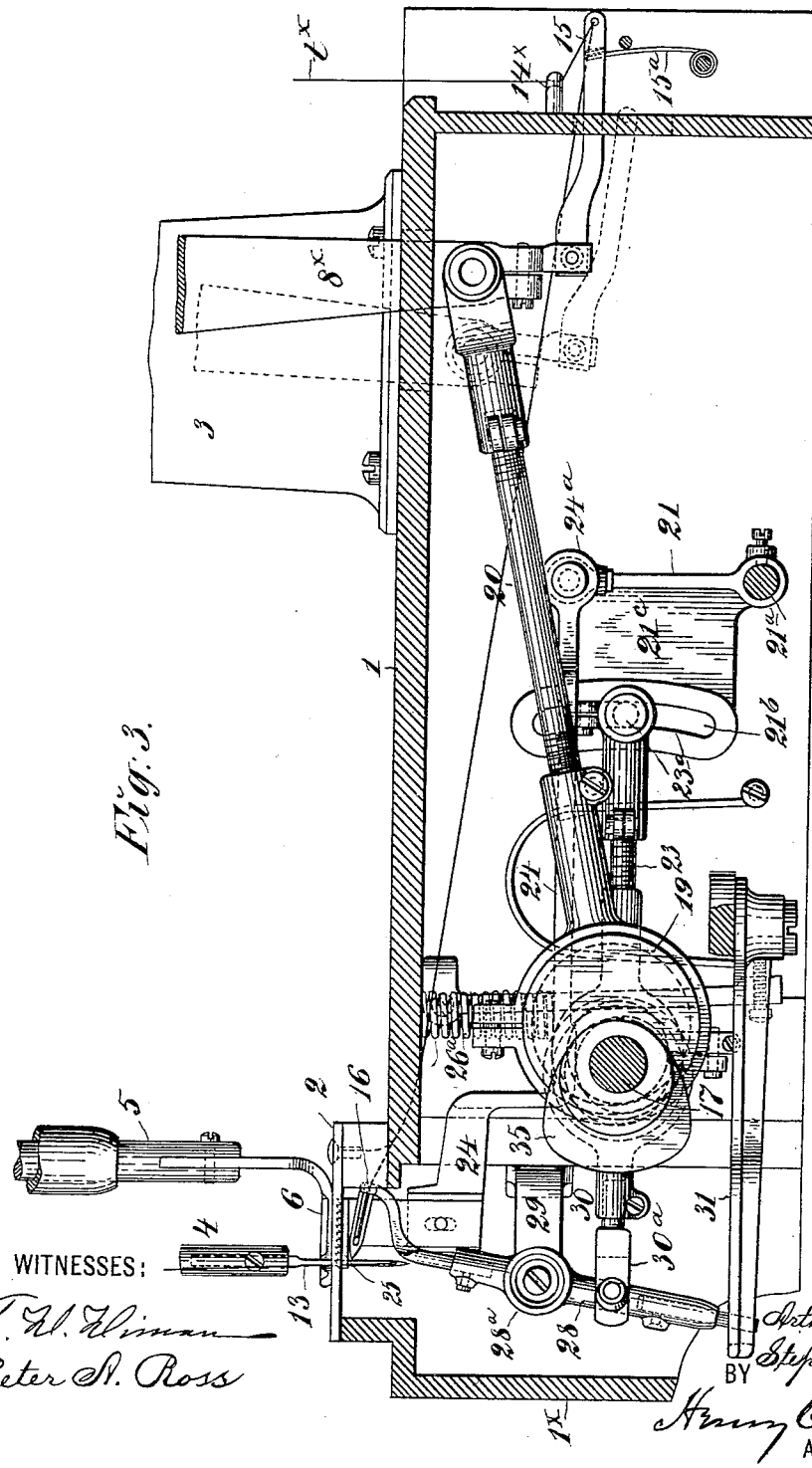
WITNESSES:
J. W. Hinman
Peter N. Ross
INVENTORS
Arthur A. Bouton
Stephen H. Varnum
BY
Henry Connett
ATTORNEY

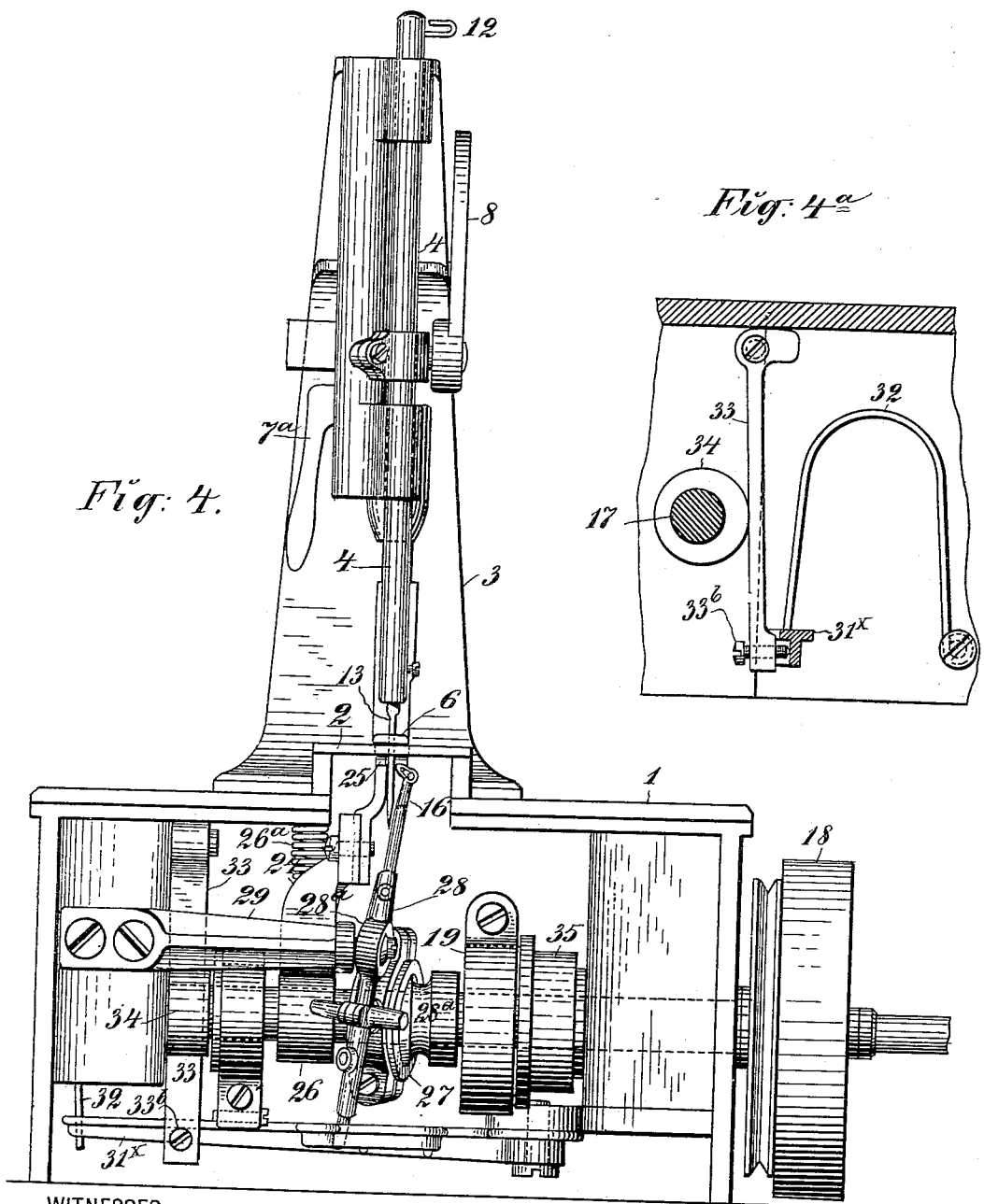

No. 623,351. Patented Apr. 18, 1899.
A. A. BOUTON & S. H. VARNUM.
SEWING MACHINE.
(Application filed Mar. 12, 1898.)
(No Model.) 6 Sheets—Sheet 5.
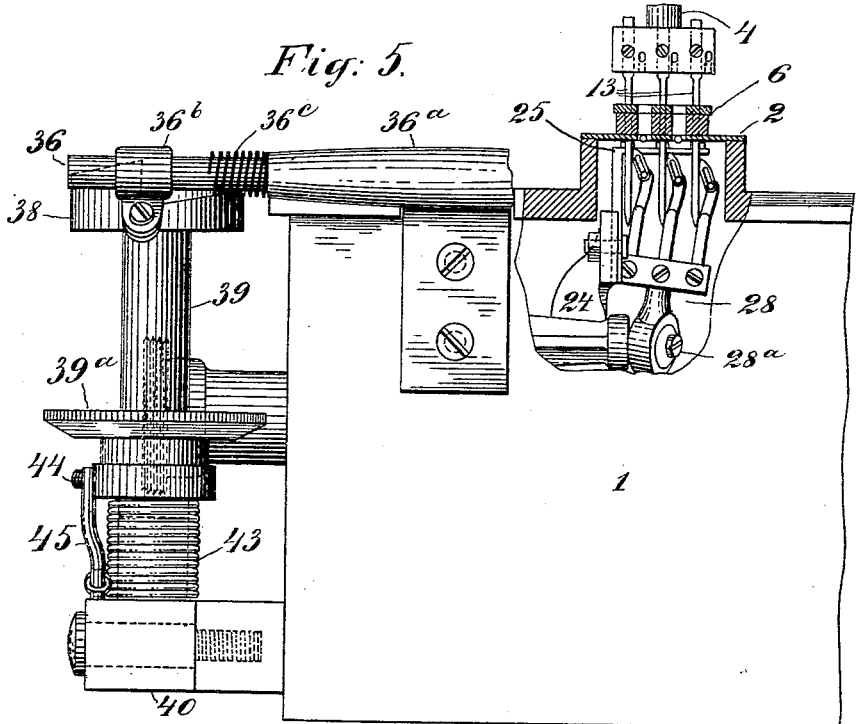
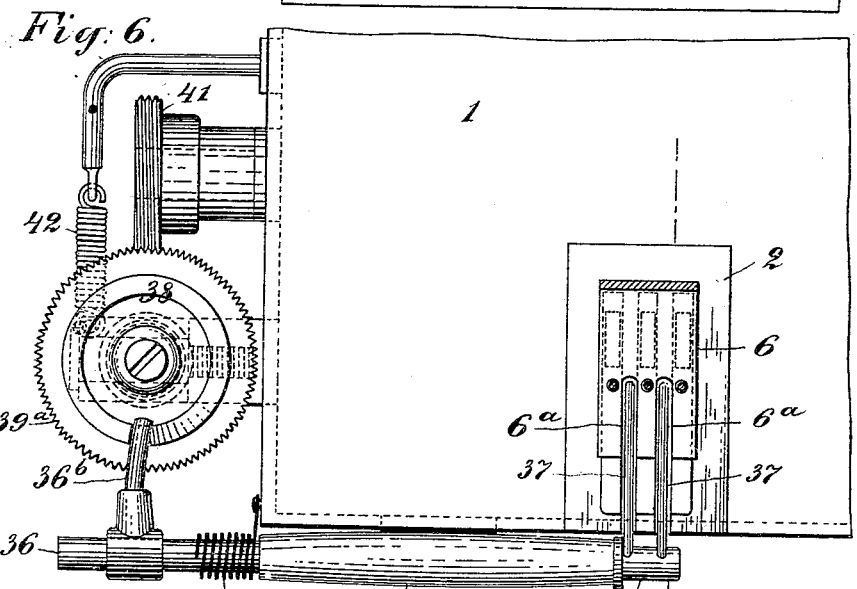

No. 623,351. Patented Apr. 18, 1899.
A. A. BOUTON & S. H. VARNUM.
SEWING MACHINE.
(Application filed Mar. 12, 1898.)
(No Model.) 6 Sheets—Sheet 6.
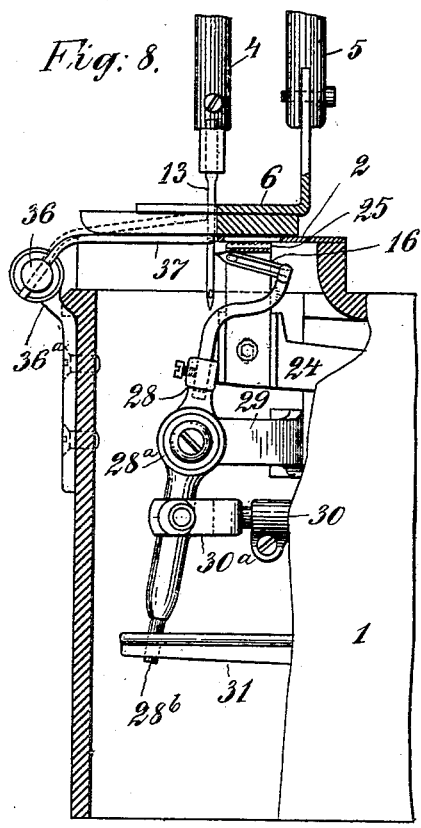
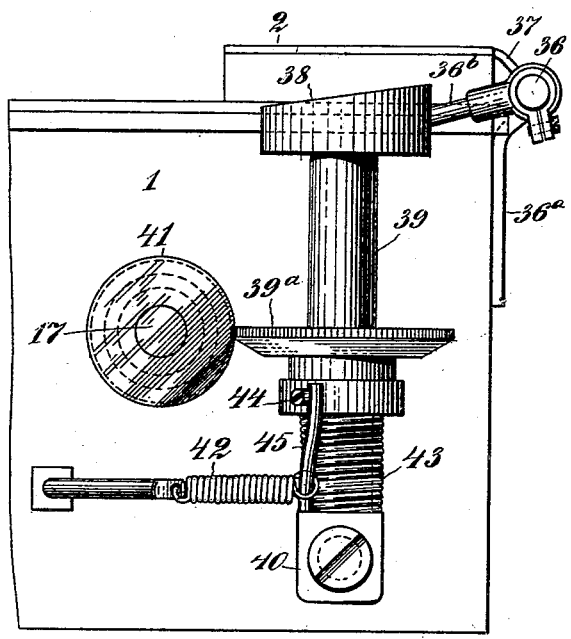
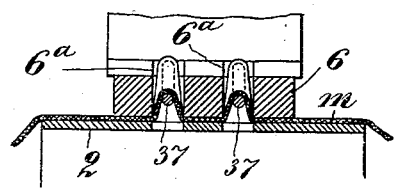
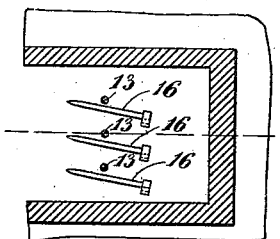
WITNESSES:
INVENTORS.
Arthur A. Bouton
Stephen H. Varnum
BY
Henry Connett
ATTORNEY

UNITED STATES PATENT OFFICE.

ARTHUR A. BOUTON AND STEPHEN H. VARNUM, OF NEW YORK, N. Y.

SEWING-MACHINE.

SPECIFICATION forming part of Letters Patent No. 623,351, dated April 18, 1899.

Application filed March 12, 1898. Serial No. 673,551. (No model.)

*To all whom it may concern:*

Be it known that we, ARTHUR A. BOUTON and STEPHEN H. VARNUM, citizens of the United States, and residents of the borough of Brooklyn, Kings county, and city and State of New York, have invented certain new and useful Improvements in Sewing-Machines, of which the following is a specification.

This invention relates to the class of sewing-machines which form a double chain-stitch by means of an eye-pointed needle and a coöperating thread-carrying looper; and the improvements reside partly in the construction of the machine as adapted for sewing in general and partly in certain improvements which adapt the machine for forming diverging lines or rows of ornamental stitching on the backs of gloves.

In the accompanying drawings, which illustrate an embodiment of the invention, Figure 1 is a side elevation of the machine, showing the mechanism above the base; and Fig. $1^a$ is a vertical transverse section of the machine-arm and needle-lever at the point indicated by line $x'^a$ in Fig. 1. Fig. 2 is a horizontal section of the machine, just below the base-plate, showing the mechanism within the base in plan. The plane of the section is indicated by line $x^2$ in Fig. 1. Fig. $2^a$ is a detached fragmentary view illustrating the ball-eccentric which actuates the looper. Fig. 3 is a vertical section through the base of the machine in the plane indicated by line $x^3$ in Fig. 2, showing the mechanism within the base in side evevation. Fig. 4 is a front elevation of the machine, the front portion of the base being removed to disclose the mechanism within the base; and Fig. $4^a$ is a fragmentary view illustrating the means for operating the looper-guide. Figs. 5, 6, 7, 8, and 9 illustrate the machine as provided with a gang of stitch-forming devices and with means for producing simultaneously diverging rows of stitches. Fig. 5 is a fragmentary end view of the machine. Fig. 6 is fragmentary plan. Fig. 7 is a side view from the left in Fig. 6. Fig. 8 is a sectional view in the plane of line $x^3$ in Fig. 6; and Fig. 9 is a transverse section, on a larger scale than the other views, of the slotted presser-foot and lifting-fingers. Fig. 10 is a plan view showing the oblique arrangement of the gang of loopers.

Referring primarily to Figs. 1 to 4, the base 1 of the machine may be of any suitable form and be constructed of any suitable material. As here shown it is supposed to be of cast-iron and hollow to contain the mechanism that is usually below the cloth-plate. This base is here shown provided with an elevated cloth-plate 2 and a removable end piece $1^\times$ to afford convenient access to the mechanism. On the base is mounted the arm 3 of the machine, provided with suitable guides for the needle-bar 4 and presser-foot bar 5, to which is secured the presser-foot 6. The presser-foot will have a spring 7 and an ordinary lifting device $7^a$. (Seen in Fig. 4.)

The needle-lever 8 is fulcrumed at $y$ on the arm of the machine and is coupled at its front end to the vertically-arranged needle-bar. It is L-shaped, and its pendent arm $8^\times$ depends through and plays in a slot in the base, at the rear end of same, and receives its vibratory motion from mechanism within the base. The upper thread $t$, Fig. 1, comes from a spool, (not shown,) passes about a tension device 9, thence through a take-up device 10, (to be more particularly described hereinafter,) thence through a guide 11 on the needle-lever, thence through a guide 12 on the needle-bar, and thence down to the needle 13. The lower thread $t^\times$ comes from a spool, (not shown,) passes about a tension device 14, (to be more particularly described hereinafter,) thence (Figs. 2 and 3) through a guide on the base, (either the rigid guide $14^\times$ or the yielding spring-guide $15^a$,) and thence through an eye in a take-up arm 15, forming a part or extension of the pendent arm $8^\times$ of the needle-lever, and thence forward to the looper 16.

The main operating-shaft 17 extends transversely of the machine in the base, near the front end thereof, and it has bearings in the base. On its outer end it has or may have a driving-wheel 18, Figs. 2 and 4, through which it can be driven by any power desired. On the shaft 17, within the base, is fixed an eccentric 19, which imparts a vibratory motion to the needle-arm through the medium of a yoke and connecting-rod 20, the latter being coupled to the lower end of the arm $8^\times$ of the needle-lever.

The feeding mechanism comprises a rocker 21, fixed on a rock-shaft $21^a$, extending across the hollow of the base and having bearings in the sides thereof. This device is rocked by an eccentric 22, Fig. 2, on the main shaft 17, the yoke of which is coupled by a connecting-rod 23 with the rocker 21. In order to vary the extent of the rocking motion imparted to the rocker 21 by the eccentric 22, the rocker has a curved slot $21^b$ formed in a web or flange $21^c$ thereon, and the stud or pin $23^a$, which couples the connecting-rod 23 thereto, is adapted to be adjusted and set at any desired point along said slot.

The feed-bar 24 is coupled to the upper end of the rocker 21 at $24^a$, extends forward, and carries on an upright branch, at its front end, the serrated feeding-foot 25. The eccentric 22 imparts the horizontal reciprocating movement to the feeding-foot, and the vertical movement—it being a four-motion feed—is imparted by an eccentric 26 on the main shaft, upon which eccentric the feed-bar rests. A spring $26^a$ over the feed-bar keeps it pressed down elastically on the lifting-eccentric 26. The length of the stitch is regulated by the adjustment of the coupling stud or pin $23^a$ up or down in the slot $21^b$ in the rocker 21.

The mechanism for operating the looper 16 will now be described; but before doing so it may be well to state that this looper itself may be of a well-known kind, and herein it has a somewhat orbital movement similar to that in other stitch-producing mechanisms; but so far as we are aware in all cases heretofore the path of the looper has either been parallel to the direction of the feed or at right angles thereto, while in our machine the path of the looper is oblique to the direction of the feed. The reason for this will be hereinafter explained. The looper moves forward obliquely along one side of the needle, then swings over laterally, and returns obliquely along the other side of the needle. To impart this motion to the looper, a ball-eccentric 27, Fig. $2^a$, is employed to give the normal reciprocating movement to the looper in the direction of the length of the latter. The stem or shank of the looper is fixed, preferably in a removable manner, in a socket in the upper end of a looper-carrier 28, which is like a lever, and is mounted at a point near its middle on a fulcrum-bracket 29 on the base by a ball-joint or universal joint $28^a$. The yoke of the ball-eccentric 27 is coupled to the looper-carrier 28 by a connecting-rod 30, the coupling to the carrier below the fulcrum being effected by means of a fork $30^a$. The lateral motion of the looper is permitted by the ball-eccentric 27 and the ball-joint $28^a$ and it is effected by means now to be described.

A looper-guide 31 has in it a slot $31^a$, in which plays the lower extremity of the looper-carrier 28. This guide 31 is mounted to turn in a horizontal plane about a pivot $31^b$ in the base and has an arm $31^x$, backed by a spring 32. (Seen best in Figs. 2, 3, and $4^a$.) This spring may be arranged in any manner and have any form; but it is here shown as of an inverted-U shape, one end being fixed to the base 1 and the other engaging a hole in the arm $31^x$. The spring 32, Fig. $4^a$, presses the arm $31^x$ up to a pendent fender 33, pivoted to the base 1 and interposed between the arm $31^x$ and an eccentric 34 on the main shaft 17. This eccentric 34 and its coöperating spring 32 impart to the looper-guide 31 a vibrating motion transversely of the machine and about the pivot $31^b$, and this movement of the slotted guide imparts the proper lateral movement to the looper 16. The movement of the looper in the direction of its length being oblique to the longitudinal axis of the machine, the guide-slot $31^a$ is also oblique to the said axis.

As before stated, it is not new to impart an orbital movement to a looper coöperating with a needle; but the purpose here is to so construct and arrange the mechanical devices which impart motion to the looper as to permit of operating the machine with great rapidity and the placing of the ball-joint or fulcrum $28^a$ at about the middle point of the looper-carrier—that is, considering the looper and its carrier as a lever, with the joint $28^a$ as a fulcrum near the middle of this lever, and applying the power for operating the looper to the arm of said lever at the side of the fulcrum opposite to that where the looper is situated the mechanism is so balanced as to avoid the production of momentum to such a degree as would interfere with the rapid operation of the machine.

Having now described the general construction of the machine, the details will be described.

Referring to Figs. 1 and $1^a$, the take-up device 10 for the upper thread $t$ comprises an upright stem $10^a$, mounted on the arm 3 of the machine and preferably removably and adjustably mounted in a bracket $3^a$, Fig. $1^a$, thereon. To effect this, the stem is passed down through a hole in the bracket and secured by a set-screw in a well-known way. At its upper end this stem has a slot $10^b$ for the upper thread to pass through. On the stem is a coil-spring $10^c$, over or on which may be placed a washer or plate $10^d$. On the needle-lever 8 is mounted adjustably a depressor $10^e$ of an L shape, the horizontal arm of which takes over the upper end of the spring and washer on the stem $10^a$, whereby when the needle-arm descends with the needle the spring $10^c$ is depressed and compressed, and when the needle-arm rises the said spring is permitted to distend upwardly under the thread $t$. This take-up device is very important in several respects. It is perfectly adjustable, the stem $10^a$ and the depressor $10^e$ both being adapted for vertical adjustment up or down independently of each other. By shifting the slotted post vertically it operates as a stitch-tightener and enables the stitch to be automatically tightened to a substantially equal extent at the end of each stroke. The take-up also enables the operator to control the size the loop shall be at the moment the looper enters it. If this loop is too large, the thread is liable to kink, and if too small the looper is liable to miss it for this reason. The mounting of the depressor on the needle-lever is so that it will depress the spring $10^c$ below the slot in the stem at the end of the downstroke and so that the needle may rise enough to form a loop of the proper size and the looper to engage it before the spring takes under the passing thread.

The construction of the take-up 10 when properly adjusted so controls the thread as to permit the operator to "chain off" or run off the edge of the goods, the stitch-making mechanism being able to produce a stitch without the pressure of the goods on the needle and thread and in thin or "slazy" goods as well as in thicker material.

It is often desirable in stitching to supply piece after piece of goods under the presser-foot in succession without cutting the threads, the pieces of goods being then connected together like a chain. In such cases on the ordinary machines care must be taken that the needle does not pass off from one piece of goods before it can enter the piece following, as in that case the thread would become "snarled" and no stitch would be formed. This is because the pressure of the goods on the needle and thread passing through it is necessary to the formation of the loop and stitch. With this machine, however, the quality of the goods through which the needle passes is not material to the formation of the stitch, nor is it necessary that there be any goods at all, and one piece of goods need not follow another closely, as the machine will chain off or run without any goods under the presser-foot for any reasonable distance without snarling or breaking the threads. This result is due mainly to the mounting of the depressor $10^c$ on the needle-lever so that it engages the spring $10^c$ just before the completing of the downward movement of the needle, thereby removing undue pressure from the thread and insuring a loop of the proper size being formed at the time it is needed for the reception of the looper.

The construction of the take-up device 10 has been described exactly as herein illustrated; but it will be obvious to any one skilled in the art that the minor details of its construction may be varied in many ways without interfering with its effectiveness. The plate $10^d$ is not essential.

The tension device 14 may be of the usual kind—namely, two disks to embrace the thread, a spring to press one of the disks up to the other, and a nut or screw to regulate the strength of the spring. In order that a stop to the movement of the under thread through the tension device 14 may be put on the thread at the moment the take-up 15 is acting, and thus prevent the slack from being drawn from the spool, a flat spring $14^a$ is secured at one end to the machine-arm, and at its outer or free end, which is forked, it takes over the outer disk of the tension device 14. On the arm $8^x$ of the needle-lever is fixed an arm $14^b$, which moves or vibrates with the needle-lever, its free end projecting out over and bearing on the spring $14^a$ near the tension device 14. As the needle-lever vibrates the arm $14^b$ moves to and fro over the spring $14^a$, causing it to press thereon and stiffen said spring, causing the tension device to clamp on and hold the thread when the take-up for the under thread is acting.

The motion of every part of the machine is derived from the cross-shaft 17, situated at the front ends of the base 1, where ready access may be had to it. The take-up arm 15 for the under thread is connected directly to the pendent end of the needle-lever, and the connecting-rod 20, which operates the needle-lever, is also coupled directly to said lever, as clearly shown in Fig. 3. Preferably the rods 20, 23, and 30 will all be made capable of longitudinal adjustment, as shown, and a counterweight 35 is provided on the shaft 17 to substantially equalize the rotary motion.

In order to adjust the looper-guide 31 and take up wear, the fender 33 (see Fig. $4^a$) is provided with a screw $33^b$ in the fender and bearing on the arm of the guide 31 to adjust the latter.

To insure against looseness by wear, the looper-carrier 28 is provided at its lower end with a pin $28^b$ to engage the slot $31^a$ in the looper-guide. This pin may be of steel, removably and adjustably mounted in the carrier. For example, the carrier may be bored and screw-threaded and the pin screwed therein.

The adaptation of the machine for producing diverging rows of stitching (two or more rows) will now be described with reference especially to Figs. 5, 6, 7, 8, and 9. These figures illustrate the adaptation to the machine (otherwise similar to that described above) of a gang of three needles 13 and three loopers 16, the needles all being carried by one needle-bar 4 and the loopers by one looper-carrier 28. There should also be three serrated feet 25, carried by the feed-bar. The presser-foot 6 in this case is broad and has in it three needle-holes for the passage of the needles and two grooves or slots $6^a$, opening out at the front end of the foot and situated between the adjacent needle-holes, as clearly shown in Figs. 5 and 6.

It will be understood that with the construction as above described three parallel rows of stitching would be formed in the goods or material passed through the machine; but it is sometimes desirable to make these rows of stitching diverge—as, for example, in the ornamental stitching on the backs of gloves—and to effect this divergence mechanism is employed which will now be described.

A rock-shaft 36, mounted in a bearing $36^a$ on the machine-base and extending transversely thereof, is provided with lifting-fingers 37, which rest normally in recesses in the cloth-plate in such a position that the material to be stitched rests on them, the slots 6ª in the presser-foot being directly over these fingers, so that the latter may rise and carry up folds of the material (see m in Fig. 9) into said slots when the shaft 36 is rocked. In Fig. 8 the position of the fingers 37 when elevated is indicated in dotted lines. The stitching begins when the fingers 37 are depressed to the position seen in full lines in Fig. 8, and as the sewing progresses the fingers gradually rise to the position seen in dotted lines in Fig. 8, thus gradually taking up the material m more and more between the rows of stitches, so that when the stitching is completed, the material removed from the machine, and the folds flattened out it will be found that the rows of stitches diverge.

To operate the fingers 37, the shaft 36 is gradually rocked by a cam 38, fixed on an upright tubular spindle 39, which slips over a pin on a rocking bracket 40 on the base 1. An arm 36ᵇ on the shaft 36 rests on the warped face of the cam 38 and rotary motion is imparted to the cam by a worm 41 on the main shaft 17, which gears with a worm-wheel 39ª on the cam-spindle 39. The wheel 39ª is held in gear with the worm 41 by a spring 42, and it is only necessary for the operator to push over the cam and its spindle (toward the right in Fig. 7) to disengage the gears, the rocking of the bracket 40 and yielding of the spring 42 permitting this. As soon as the gears are thus disengaged a torsion-spring 43 on the spindle 39, secured at one end thereto and at the other end to the bracket 40, rotates the spindle and with it the cam 38 back to their first position. This spring 43 is wound up or put under tension by the rotation of the cam-spindle by the worm 41. It is not designed to have the cam 38 make a complete rotation, and if the rows of stitching are short it may only make a very small part of a rotation. It will be obvious that the degree of divergence and convergence of the rows of stitching will depend on the formation of the cam 38, assuming that the latter be in all cases rotated at the same rate of speed. The form of the cam and its rate of speed relatively to the main shaft 17 may of course be varied almost indefinitely within this invention.

When the gears are disengaged and the torsion-spring rotates the cam-spindle and cam back to their normal position, a suitable stop device should be provided to limit the extent of the back rotation, and this may be a screw or stud 44 in the boss of the worm-wheel, Fig. 7, adapted to engage a stud 45 on the bracket 40.

The rock-shaft 36 may have, if desired, a torsion-spring 36ᶜ to keep the arm 36ᵇ thereon pressed down elastically on the face of the cam 38; but this is not an essential feature. Gravity may be relied on for this, if desired, or after the work is taken out the operator may press down said arm with his fingers.

If the machine is making a single row of stitching, the spring take-up 15ª may be used; but for more than one row, as herein contemplated, the positive take-up 15 will be desirable.

Fig. 10 shows in plan the oblique arrangement of the loopers. Where the loopers and needles are arranged in a gang and the loopers move in a plane parallel with the feed, the needles must be "staggered," which is very objectionable, as it does not begin the lines of stitching abreast. By giving the loopers a path oblique to the plane of the feed (indicated by the line and arrow in Fig. 10) the needles may be brought closer together and abreast. The oblique movement of the looper (with one or more needles) when the latter is making its backward movement insures the passage of the needle in its descent to the left of the loop in the next following stitch, while with a looper moving in line with the feed the slack of the under thread is liable to twist to the wrong side of the needle and break the stitch.

Having thus described our invention, we claim—

1. In a sewing-machine, the combination with an upright, lever-like looper-carrier, having a universal fulcrum 28ª, and a curved looper mounted in the upper end of said carrier, of a rotating eccentric, eccentric-yoke and connecting-rod, the latter coupled to said carrier below its fulcrum, a vibrating guide engaging the lower end of said carrier, substantially as set forth.

2. In a sewing-machine, the combination with an upright, lever-like looper-carrier, having a universal fulcrum, a guide having an oblique slot engaged by the lower end of said carrier, operating means coupled to said carrier between said fulcrum and said guide for imparting a vibrating movement to the carrier, means for vibrating said guide, and a curved looper in the top of said carrier, the axis of the looper being substantially at right angles to that of the carrier; substantially as set forth.

3. In a sewing-machine, the combination with the main shaft and the looper-carrier mounted on a universal joint at a point between its ends, of a ball-eccentric 27, on the main shaft, its yoke, a connecting-rod coupled to said looper-carrier below the joint on which it is mounted, and means for imparting lateral vibrations to the lower extremity of the looper-carrier, substantially as set forth.

4. In a sewing-machine, the combination with the main shaft and the upright looper-carrier mounted on a universal joint at a point between its ends, of the pivoted looper-guide 31, having a slot 31ª, engaged by the lower end of the looper-carrier, an eccentric 34 on the main shaft, a spring situated so as to press the arm of the looper-guide up toward said eccentric, and a fender 33, interposed between the eccentric 34 and the arm of the looper-guide, substantially as set forth.

5. In a sewing-machine, a take-up for the upper thread comprising an upright guide for the thread, a take-up spring under the thread, and a depressor carried by the needle-lever and adapted to take the pressure of said spring off from the thread when the needle is at the end of its downstroke.

6. In a sewing-machine, a take-up for the upper thread comprising an upright, slotted guide for the thread mounted for vertical adjustment on the machine-arm, a take-up spring on said guide and adapted to press upwardly on the thread when unrestrained, and adjustable means carried by the needle-lever for restraining said spring when the needle is depressed, substantially as set forth.

7. In a sewing-machine, the combination with the arm of the machine, and the vibrating needle-arm 8, of the stem $10^a$, having in it a slot through which the thread passes, a coil-spring $10^c$ on said stem, and a depressor $10^e$ on the needle-bar and adapted to compress the spring $10^c$ when the needle-arm descends, substantially as set forth.

8. In a sewing-machine having a gang of needles for producing simultaneously two or more rows of stitches, the combination with the stitch-producing mechanism, of means for producing a varying distance between said rows of stitches, said means comprising a suitably-grooved presser-foot, a lifting finger or fingers lying normally below the level of the cloth-plate and alined with the respective grooves in the presser-foot, and means for automatically and gradually elevating said finger or fingers as the stitching progresses, substantially as set forth.

9. In a sewing-machine having a gang of needles for producing simultaneously two or more rows of stitches, the combination with the stitch-producing mechanism, of means for producing a varying distance between said rows of stitches, said means comprising a presser-foot having grooves $6^a$ arranged in line with the spaces between the needles, a rock-shaft 36 having fingers 37 lying normally below the surface of the cloth-plate and alined with the respective grooves in the presser-foot, and having also an arm $36^b$ which rests on the face of a cam 38 mounted on an upright spindle, the said cam and spindle, and gearing for driving said spindle from the shaft of the machine, substantially as set forth.

10. In a sewing-machine having a stitch-producing mechanism which produces two or more rows of stitches simultaneously, the means for varying the distance gradually between said rows of stitches, said means comprising the rock-shaft 36, provided with a lifting finger or fingers 37, a grooved or slotted presser-foot over said finger or fingers, an upright spindle 39, having a bearing in a rocking bracket 40, a cam 38 on the upper end of said spindle, an arm $36^a$ on the rock-shaft, bearing on the face of said cam, a worm 41 on the main shaft of the machine, a worm-wheel $39^a$ on the spindle 39, and held in gear with said worm by a spring 42, and the said spring, substantially as set forth.

In witness whereof we have hereunto signed our names, this 28th day of February, 1898, in the presence of two subscribing witnesses.

ARTHUR A. BOUTON.
STEPHEN H. VARNUM.

Witnesses:
JOHN H. LE FEVRE,
SAMUEL LEVY.